United States Patent
Atkins et al.

(10) Patent No.: US 11,993,362 B2
(45) Date of Patent: May 28, 2024

(54) DUAL-CONCENTRIC CONTROL VALVE WITH DIRECT DRIVE CONTROL AND FAILED MOTOR PROTECTION

(71) Applicant: Textron Innovations Inc., Providence, RI (US)

(72) Inventors: Brady Garrett Atkins, Euless, TX (US); Robert Paul Reynolds, Euless, TX (US); Carlos Alexander Fenny, Fort Worth, TX (US); Charles Eric Covington, Colleyville, TX (US)

(73) Assignee: Textron Innovations Inc., Providence, RI (US)

( * ) Notice: Subject to any disclaimer, the term of this patent is extended or adjusted under 35 U.S.C. 154(b) by 292 days.

(21) Appl. No.: 17/509,048

(22) Filed: Oct. 24, 2021

(65) Prior Publication Data
US 2022/0041266 A1    Feb. 10, 2022

Related U.S. Application Data

(63) Continuation of application No. 15/887,664, filed on Feb. 2, 2018, now abandoned.

(51) Int. Cl.
| | |
|---|---|
| *B64C 11/38* | (2006.01) |
| *B64C 27/64* | (2006.01) |
| *F01B 9/00* | (2006.01) |
| *F01B 25/10* | (2006.01) |
| *F16K 11/20* | (2006.01) |
| *F16K 31/04* | (2006.01) |

(52) U.S. Cl.
CPC .............. *B64C 11/38* (2013.01); *B64C 27/64* (2013.01); *F01B 9/00* (2013.01); *F01B 25/10* (2013.01); *F16K 11/20* (2013.01); *F16K 31/047* (2013.01)

(58) Field of Classification Search
CPC .................................. B64C 11/38; F16K 11/20
See application file for complete search history.

(56) References Cited

U.S. PATENT DOCUMENTS

| | | | |
|---|---|---|---|
| 7,828,245 B2 * | 11/2010 | Suisse | B64C 13/505 |
| | | | 244/99.2 |
| 2016/0341226 A1 * | 11/2016 | Heverly, II | F04B 11/00 |
| 2017/0217600 A1 * | 8/2017 | Regev | B64D 35/02 |

FOREIGN PATENT DOCUMENTS

| | | | |
|---|---|---|---|
| DE | 102014207393 B4 * | 6/2020 | F16K 11/044 |

OTHER PUBLICATIONS

Chinese Exam Report in related Chinese Patent Application Publication No. 201910109200.3 dated Jun. 30, 2023, 12 pages.

* cited by examiner

*Primary Examiner* — Justin D Seabe
*Assistant Examiner* — John S Hunter, Jr.
(74) *Attorney, Agent, or Firm* — Lightfoot & Alford PLLC

(57) ABSTRACT

Systems and methods include providing an aircraft with a direct drive dual-concentric valve (D3V) having a body, an outer secondary spool coaxially located within a bore of the body and linearly displaceable relative to the body, an inner primary spool coaxially located within a bore of the secondary spool and linearly displaceable relative to the secondary spool and the body. A plurality of piezo stacks is coupled to a first end of the primary spool, and applying a voltage to at least one of the piezo stacks causes an output stroke of the plurality of the piezo strokes for displacing the primary spool. The secondary spool is displaced together with the primary spool relative to the body if displacement of the primary spool relative to the secondary spool cannot occur.

11 Claims, 4 Drawing Sheets

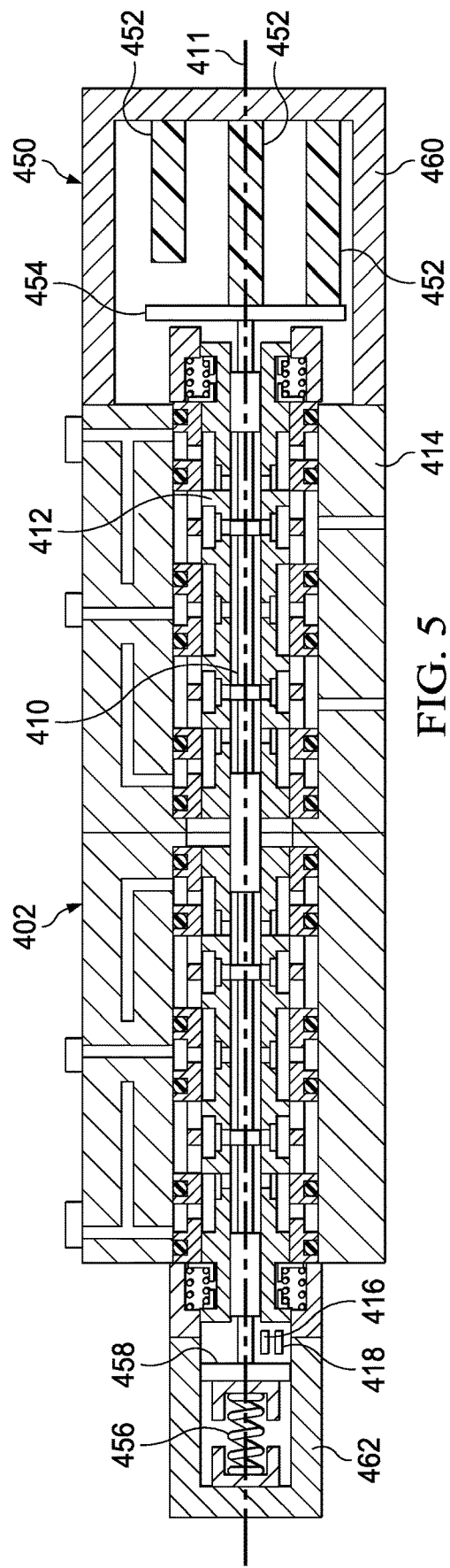
FIG. 5
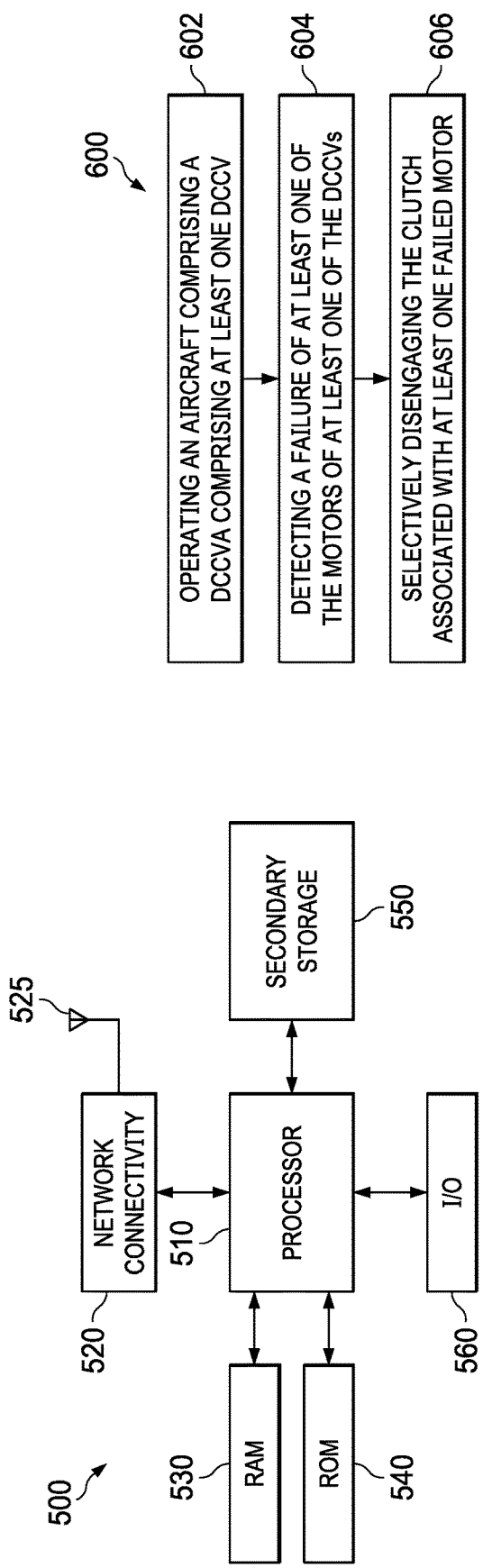
FIG. 7
FIG. 6

DUAL-CONCENTRIC CONTROL VALVE WITH DIRECT DRIVE CONTROL AND FAILED MOTOR PROTECTION

CROSS-REFERENCE TO RELATED APPLICATIONS

This application is a continuation of U.S. patent application Ser. No. 15/887,664, filed on 2 Feb. 2018, titled "Dual-Concentric Control Valve with Direct Drive Control and Failed Motor Protection," the disclosure being expressly incorporated by reference in its entirety.

STATEMENT REGARDING FEDERALLY SPONSORED RESEARCH OR DEVELOPMENT

Not applicable.

BACKGROUND

Aircraft include complex flight control systems having various flight control components that are electrical, mechanical, hydraulic, pneumatic, magnetic, and/or any combination thereof. These flight control components are capable of adjusting the flight characteristics of an aircraft to accommodate changes in and/or various operational modes of the aircraft, speeds and/or altitudes, and/or environmental conditions. Often, these flight control systems also include many sensors, gauges, or the like to monitor the operation of the flight control components of the aircraft. However, due to the complex nature, continuous use, and/or strain imparted on many of these flight control components, some flight control components may be prone to failure, which may result in degraded control or loss of control of an aircraft and/or total catastrophic loss of the aircraft.

BRIEF DESCRIPTION OF THE DRAWINGS

FIG. 5 is a cross-sectional side view of yet another embodiment of a direct drive, dual concentric valve ("D3V") according to this disclosure.

FIG. 6 is a schematic diagram of a general-purpose processor (e.g., electronic controller or computer) system suitable for implementing the embodiments of this disclosure.

FIG. 7 is a flowchart of a method of operating an aircraft according to this disclosure.

DETAILED DESCRIPTION

In this disclosure, reference may be made to the spatial relationships between various components and to the spatial orientation of various aspects of components as the devices are depicted in the attached drawings. However, as will be recognized by those skilled in the art after a complete reading of this disclosure, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

Figure 1:
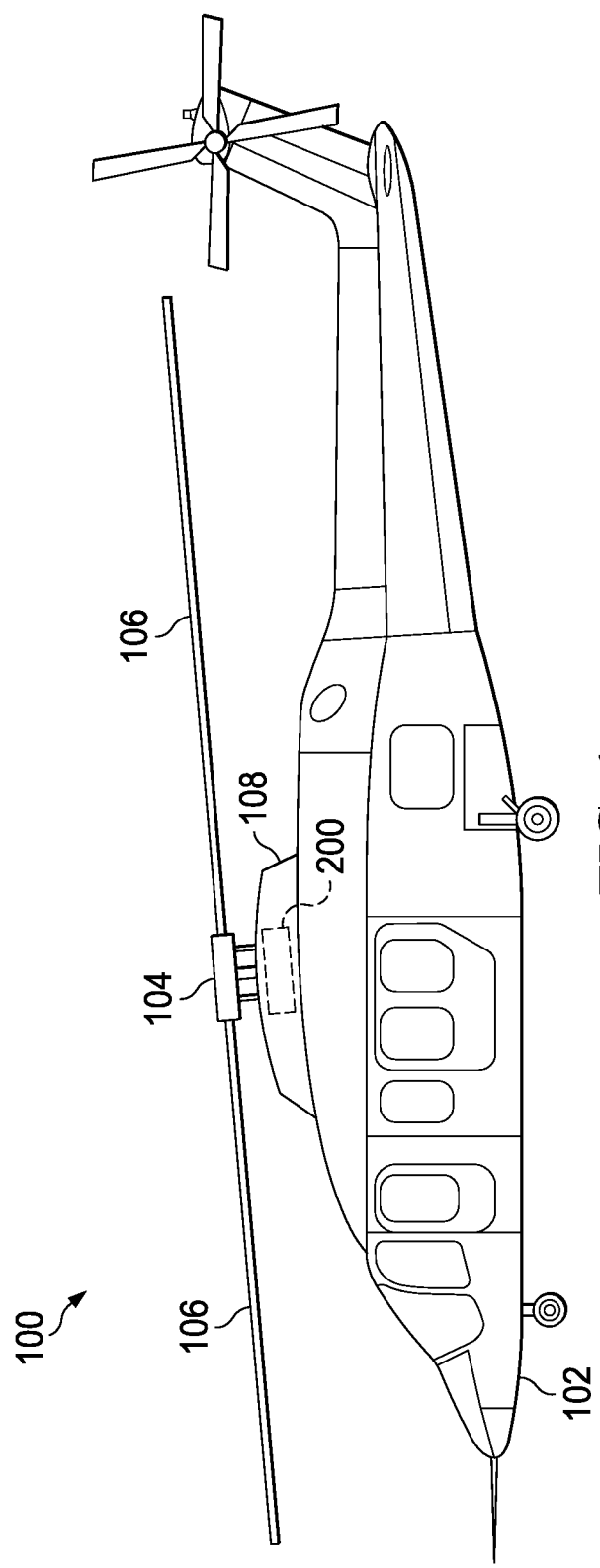
FIG. 1 is a side view of an aircraft according to this disclosure.

Referring now to FIG. 1, a side view of an aircraft 100 is shown according to this disclosure. Aircraft 100 generally comprises a fuselage 102, a rotor system 104 comprising a plurality of rotor blades 106, and a cowling 108 configured to enclose and/or house a direct drive, dual concentric valve actuator (hereinafter "D3V actuator") 200. As will be discussed later herein, D3V actuator 200 is configured to control the pitch of the rotor blades 106 through selective operation of the D3V actuator 200. Additionally, while aircraft 100 comprises a helicopter in this embodiment, it will be appreciated that in alternative embodiments, aircraft 100 may be a tiltrotor, other vertical take-off and landing (VTOL) aircraft, rotary-wing aircraft, fixed-wing aircraft, and/or other "manned" or "un-manned" aircraft. Further, it will be appreciated that while D3V actuator 200 is described in the context of an aircraft, D3V actuator 200 may also be applicable to other mobile equipment and vehicle types requiring precise control and failure tolerance benefits of a D3V actuator 200, including those found in automotive, construction, and marine applications.

Figure 2:
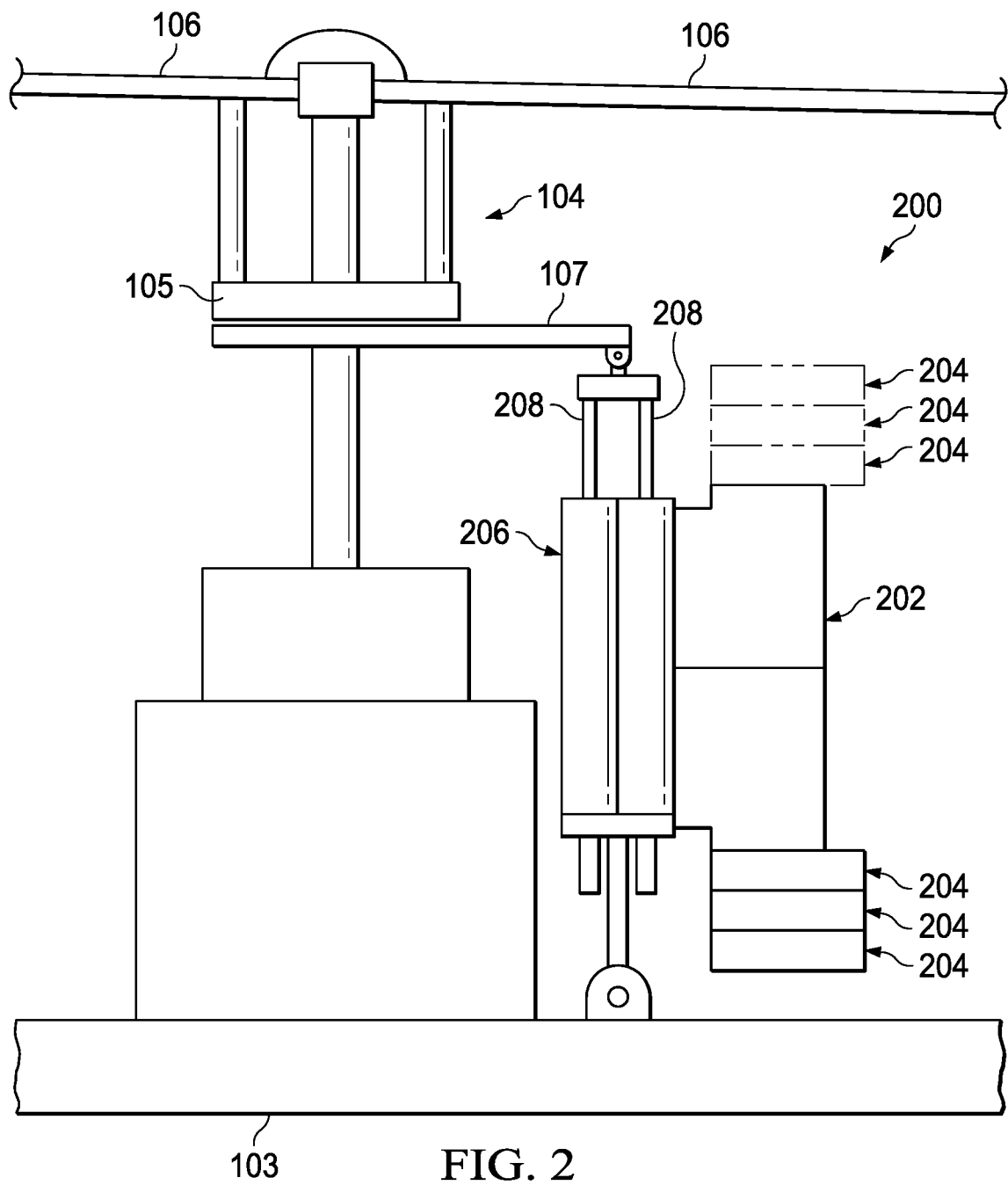
FIG. 2 is a side view of a direct drive, dual concentric valve actuator ("D3V actuator") according to this disclosure.

Referring now to FIG. 2, a simplified side view of a D3V actuator 200 is shown according to this disclosure. The D3V actuator 200 comprises a direct drive, dual concentric valve (hereinafter "D3V") 202 having a plurality of motor assemblies 204. In some embodiments, the motor assemblies 204 may be disposed on opposing sides of the D3V 202. In some embodiments, the motor assemblies 204 may be disposed on only one side of the D3V 202 (shown in FIG. 3). However, in some embodiments, the motor assemblies 204 may be arranged between the two separate spool valves of the D3V 202 that are physically separated but share a common primary spool 210. The D3V actuator 200 also comprises at least one dual piston actuator 206 comprising parallel pistons 208. However, in some embodiments, it will be appreciated that D3V actuator 200 may comprise other piston arrangements (e.g., a dual tandem arrangement). Additionally, while only one D3V actuator 200 is shown, it will be appreciated that an aircraft 100 may comprise a plurality of D3V actuators 200. Most generally, selective operation of the motor assemblies 204 generally alters a fluid flow path through the D3V 202 by displacing the primary spool 210 (shown in FIG. 3) and/or the secondary spool 212 (shown in FIG. 3) to cause selective hydraulic extension and/or retraction of the pistons 208 in order to alter and/or control the pitch of the rotor blades 106 of the aircraft 100. It will be appreciated that the secondary spool 212 may be spring loaded and will only be displaced in the event of a jam of the primary spool 210 to maintain operation of the D3V actuator 200.

The rotor blades 106 of the aircraft are coupled to a rotating ring 105 of the rotor system 104. The pistons 208 are pivotally coupled to a non-rotating ring 107 of the rotor assembly 104, while the actuator 206 is coupled to a stationary, rigid component 103 of the aircraft 100. Collectively, the rotating ring 105 and the non-rotating ring 107 may be referred to as a swashplate assembly. In some embodiments, the component 103 may be a portion of the fuselage 102. However, in other embodiments, the component 103 may be any other portion of the aircraft 100.

Accordingly, selective extension and/or retraction of the pistons 208 causes articulation of the non-rotating ring 107. This articulation is transferred to the rotating ring 105 of the rotor system, thereby altering and/or controlling the pitch of the rotor blades 106 of the aircraft 100. As such, operation of D3V actuator 200 allows a pilot and/or a flight control system to selectively alter and/or control the pitch of the rotor blades 106.

Figure 3:
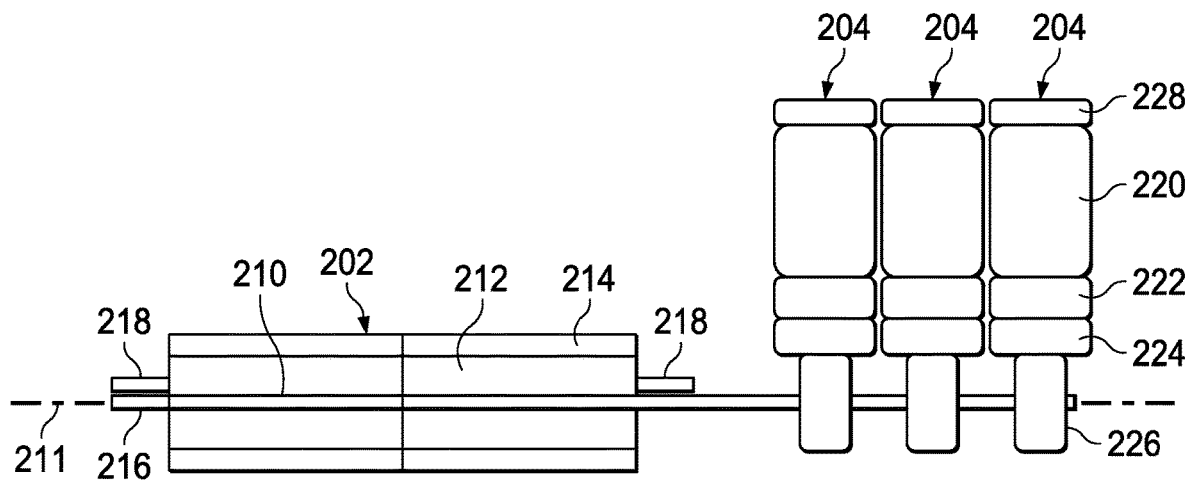
FIG. 3 is a partial cross-sectional side view of a direct drive, dual concentric valve ("D3V") according to this disclosure.

Referring now to FIG. 3, a partial cross-sectional side view of D3V 202 is shown according to this disclosure. D3V 202 generally comprises tandem (end-to-end) flow-summing four-way valves on each end. However, in some embodiments, D3V 202 may comprise tandem bypass valves. Additionally, in some embodiments, a single spool valve may be substituted for D3V 202. D3V 202 comprises an inner primary spool 210 and an outer secondary spool 212. Primary spool 210 is coaxially located within an inner bore of the secondary spool 212 along axis 211, and secondary spool 212 is coaxially located within an inner bore of body 214 along axis 211. Primary spool 210 is translatable along axis 211 relative to secondary spool 212, and secondary spool 212 is translatable along axis 211 relative to body 214. As shown, primary spool 210 and secondary spool 212 are disposed in a central position where, during operation, D3V 202 is caused to remain substantially in a steady state with no mechanical system output.

Those skilled in the art will understand that by providing the D3V 202 with the primary spool 210 and the secondary spool 212, D3V 202 may be resistant to jams and/or seizures of the D3V 202. More specifically, if primary spool 210 were to become physically stuck or otherwise fixed within secondary spool 212, D3V 202 would continue to function properly to alter a fluid path through D3V 202 to actuate actuator 206. However, instead of a fluid path being created by the displacement of primary spool 210 with respect to secondary spool 212, a substantially similar fluid path would be created as a result of the displacement of secondary spool 212 with respect to body 214.

In some embodiments, D3V 202 may comprise at least one primary spool position sensor 216 configured to monitor and/or determine the position of the primary spool 210 with respect to the secondary spool 212 and/or the body 214. Additionally, in some embodiments, D3V 202 may also comprise at least one secondary spool position sensor 218 configured to monitor and/or determine the position of the secondary spool 212 with respect to the body 214. The sensors 216, 218 may communicate with a flight control system and/or other electronic system of the aircraft 100 to relay the respective positions of the primary spool 210 and the secondary spool 212. The information received from the sensors 216, 218 may be used to verify correct operation of the D3V 202 and/or used as feedback to adjust the position of the primary spool 210 and/or secondary spool 212 to adjust the pitch of the rotor blades 106 of an associated aircraft 100.

D3V 202 further comprises a plurality of motor assemblies 204 coupled to the primary spool 210. In the embodiment shown, D3V 202 may comprise three motor assemblies 204. However, in other embodiments, D3V 202 may comprise two, four, and/or any other number of motor assemblies 204. Further, while three motor assemblies 204 are shown on one side of the D3V 202, it will be appreciated that D3V 202 may comprise at least one motor assembly 204 on an opposing side of the D3V 202. Thus, at least in some embodiments, D3V 202 may comprise at least three motor assemblies 204 on each side of the D3V 202 as shown in FIG. 2 to provide a triple redundant, direct drive, D3V 202.

Most generally, the motor assemblies 204 are configured to provide selective displacement to the primary spool 210 with respect to the secondary spool 212. In the case of a physically stuck or otherwise fixed primary spool 210, motor assemblies 204 are configured to impart sufficient torque to the primary spool 210 to override the jam by causing selective displacement of the secondary spool 212 with respect to the body 214.

Each motor assembly 204 comprises a motor 220, a clutch 222, an eccentric drive unit 224, a spool interface 226 to the primary spool 210, and a motor position sensor 228. Motors 220 comprise high-torque computer-controllable electric motors that may be controlled by the flight control system and/or other electronic system of aircraft 100. The motor position sensors 228 are configured to monitor and/or determine the position and/or rotational direction of each associated motor 220. Each motor position sensor 228 may be connected in communication with the flight control system and/or other electronic system of aircraft 100. As such, each motor position sensor 228 may be configured to communicate information regarding the position of the respective motor 220 to the flight control system and/or other electronic system. Position information of the motors 220 may be useful in determining proper operation of each motor 220.

In this embodiment, clutches 222 comprise rotary clutches 222. As such, each clutch 222 may be coupled to and/or configured to selectively rotate concurrently with the direction of rotation of the associated motor 220. Each clutch 222 is also configured to selectively engage and disengage its associated eccentric drive unit 224. As such, clutches 222 may comprise a spring-loaded pressure plate assembly and/or other clutch components that engage through friction and/or other mechanical interface. In some embodiments, the clutches 222 may be keyed, toothed, and/or otherwise comprise a complementary profile to its associated eccentric drive unit 224 to ensure proper alignment upon engagement with the associated eccentric drive unit 224. Clutches 222 may be connected in communication with the flight control system and/or other electronic system of aircraft 100. As such, each clutch 222 may be selectively engaged and/or disengaged with the associated eccentric drive unit 224 by the flight control system and/or other electronic system of aircraft 100. In some embodiments, a clutch 222 may be selectively disengaged when the associated motor 220 registers a fault and/or otherwise fails. Further, each eccentric drive unit 224 is connected to the primary spool 210 through a spool interface 226 in order to convert rotation of the motors 220 to linear displacement of the primary spool 210 and/or secondary spool 212.

Clutches 222 may comprise mechanical, electromechanical, hydraulic, electromagnetic, piezo-actuated, and/or magnetorheological clutches 222. As such, where clutches 222 comprise mechanically actuated clutches 222, clutches 222 may be selectively engaged and/or disengaged through a lever, cable, or the like. Where clutches 222 comprise electromechanically actuated clutches 222, clutches 222 may be selectively engaged and/or disengaged through at least one solenoid. Where clutches 222 are piezo-actuated, the clutches 222 may comprise layered and/or stacked piezo elements that expand and retract with the application and removal of a voltage applied to the piezo stacks to engage and disengage the clutches 222 from their associated eccentric drive units 224. Further, in some embodiments, the clutches 222 may employ a lever, arm, or other mechanical advantage to magnify the output from the layered and/or stacked piezo elements in order to provide sufficient movement to selectively engage and/or disengage the clutches 222 from their associated eccentric drive units 224. Furthermore, in some embodiments, clutches 222 may employ LEGS® motors that employ a series of piezo electric crystals to provide a high force, reliable clutch 222.

Additionally, where clutches 222 employ magnetorheological clutches 222, the clutches 222 may comprise a magnetorheological fluid (MR fluid, or MRF), that when subjected to a magnetic field, greatly increases its apparent viscosity, to the point of becoming a viscoelastic solid. Accordingly, a magnetic field may be selectively applied to and/or removed from the MRF in the clutches 222 to engage and/or disengage the clutches 222 from their associated eccentric drive units 224. In alternative embodiments, clutches 222 may comprise passive clutches 222. As such, each clutch 222 may comprise a threshold-oriented (e.g., spring-loaded) or disposable component that allows the associated motor 220 to break free from its respective clutch 222 upon reaching a predefined torque, force, and/or other rotational threshold. Such a threshold may generally be associated with a motor 220 registering a fault and/or otherwise failing. Accordingly, a faulty motor 220 may break free from its respective clutch 222 upon reaching the threshold and remain free from the clutch 222 until the threshold-oriented component is reset or replaced.

In operation, the multiple motor assemblies 204 provide redundant control over the position and/or displacement of the primary spool 210 and/or the secondary spool 212 of the D3V 202. The multiple motor assemblies 204 also provide failure mode mitigation to alleviate jams of motor 220, thereby allowing for redundant, jam-tolerant operation of D3V 202. Thus, if one or more of the motors 220 fails, the other functioning motor 220 and/or motors 220 may continue to provide displacement of the primary spool 210 and/or secondary spool 212 in order to continuously operate the D3V 202. Additionally, the non-functional motor 220 and/or motors 220 may be selectively disengaged from the primary spool 210 via the respective clutches 222. By "de-clutching" the failed motor 220 and/or motors 220, the functioning motor 220 and/or motors 220 do not have to work against the faulty and/or jammed motor 220 and/or motors 220.

It will be appreciated that the motors 220 and the clutches 222 may be actively controlled by the flight control system and/or other electronic system of the aircraft 100. Further, the motor position sensors 228 may communicate information regarding the position of the respective motor 220 to the flight control system and/or other electronic system to verify proper operation of each of the motors 220. Therefore, in the event that the flight control system and/or other electronic system determines that one or more of the motors 220 has failed, the clutch 222 corresponding to the faulty motor 220 may disengage the faulty motor 220 from the primary spool 210.

In some embodiments, the motor assemblies 204 may be configured in an active/standby configuration. As such, during operation of the D3V 202, one or more of the motors 220 is engaged in an "active" mode to operate the D3V 202, while one or more of the non-active motors 220 remains disengaged in a "standby" mode. In the event of a failure or jam of one of the active motors 220, the failed or jammed active motor 220 may be selectively disengaged, while one or more of the motors 220 in standby mode may be selectively engaged and transitioned to the active mode to maintain motor 220 operation of the D3V 202. In some embodiments, the disengagement of the faulty motor 220 and engagement of one or more standby motors 220 into the active mode may occur substantially simultaneously. Additionally, in the active/standby configuration, the motors 220 may be cycled between engagement/disengagement to determine which motor 220, if any, is faulty. As such, one of the active motors 220 may be selectively disengaged, while engaging the standby motor 220 to verify proper operation of each of the motors and/or clutches 222 to remove latent failures. Further, motors 220 in the standby mode may also to be driven to ensure proper operation and/or to keep the motors 220 in proper alignment with the primary spool without having to engage the motors 220. Still further, it will be appreciated that the primary spool position sensor 216 may be used in conjunction with the motor position sensor 228 of the one or more active motors to verify proper operation of each active motor 220, while comparison of the feedback from the motor position sensors 228 of the one or more motors 220 in standby mode may allow quicker and/or more definitive identification of a motor 220 fault.

Furthermore, in some embodiments, the motor assemblies 204 may be configured in an active configuration. In the active configuration, all three motors 220 are engaged in the active mode. Accordingly, in the event of a failure of one or more of the motors 220, the faulty motor 220 and/or motors 220 may be selectively disengaged. In some embodiments, this may allow easier troubleshooting to determine a faulty motor sensor 228 or primary spool position sensor 216, since all motors 220 should be operating concurrently and proportionally with the primary spool 210. Further, since each motor 220 is active, the motor position sensors 228 may provide substantially similar feedback into the flight control system and/or other electronic system. It will be appreciated that in this disclosure, engagement and/or disengagement of a motor assembly 204, motor 220, and/or clutch 222 may be interchanged and should be understood to have the same meanings, in that an engaged motor assembly 204, motor 220, and/or clutch 222 denotes the respective motor 220 is capable of displacing the primary spool 210, while a disengaged motor assembly 204, motor 220, and/or clutch 222 denotes the respective motor 220 is not capable of displacing the primary spool 210.

In some embodiments, the motors 220 may be coupled to and aligned with the primary spool 210 through the respective clutches 222. However, one or more of the motors 220 may remain "undriven." Thus, the one or more undriven motors 220 remain in a passive mode not operating to displace the primary spool 210, while still remaining aligned with the primary spool 210. This ensures the passive motors 220 are properly aligned with the primary spool 210 and constantly ready to be transitioned to the active mode where the motors 220 can be "driven" to displace the primary spool 210, thereby eliminating potential issues of properly aligning to the primary spool 210 when the motors 220 are selectively transitioned to the active mode. At the same time, any faulty or jammed motor 220 may be selectively disengaged. Additionally, the "undriven" motors 220 may be used to provide back-electromagnetic field (EMF) damping if the "driven" motors 220 short circuit.

Figure 4:
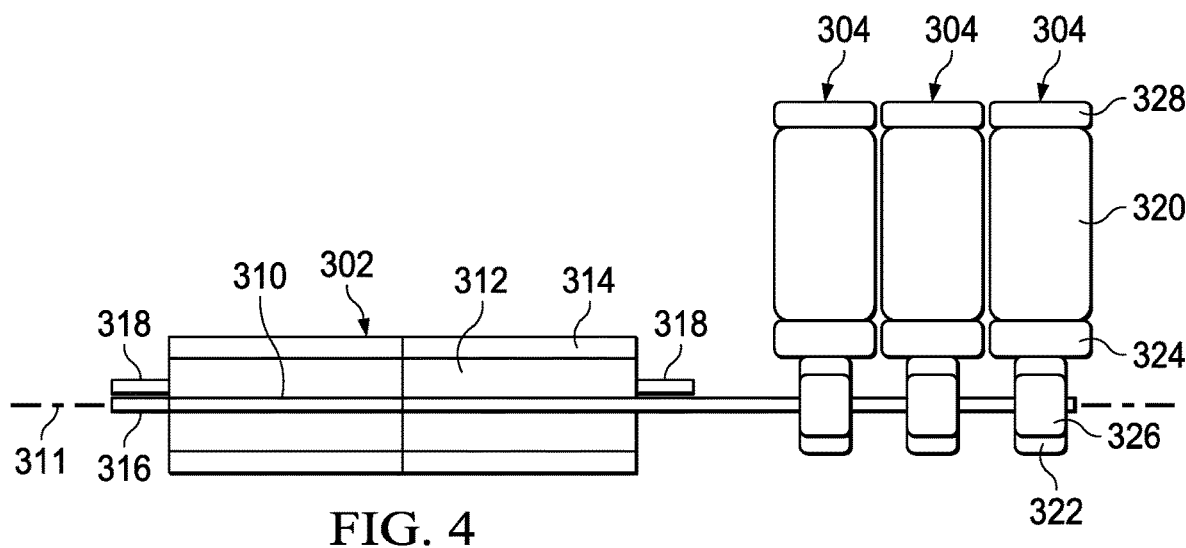
FIG. 4 is a partial cross-sectional side view of another embodiment of a direct drive, dual concentric valve ("D3V") according to this disclosure.

Referring now to FIG. 4, a partial cross-sectional side view of a D3V 302 is shown according to another embodiment of this disclosure. D3V 302 is substantially similar to D3V 202 and comprises substantially similar components as D3V 202. D3V 302 comprises a primary spool 310 and a secondary spool 312 coaxially aligned along axis 311 and disposed within body 314. In some embodiments, D3V 302 may comprise at least one primary spool position sensor 316 and at least one secondary spool position sensor 318. D3V 302 further comprises a plurality of motor assemblies 304 each comprising a motor 320, clutch 322, eccentric drive unit 324, spool interface 326, and a motor position sensor 328. D3V 302 is configured to operate in a substantially similar manner as D3V 202 and is configured for operation in D3V actuator 200 of aircraft 100. Further, it will be appreciated that D3V 302 may be controlled by a flight control system and/or other electronic system of aircraft 100 in a substantially similar manner to D3V 202. However, as opposed to D3V 202 comprising rotary clutches 222, D3V 302 comprises linear clutches 322. As such, each eccentric drive unit 324 may be coupled to its respective motor 320, while each clutch 322 may be coupled to the respective spool interface 326 and/or be configured to selectively engage and/or disengage with the respective eccentric drive unit 324 to translate rotational motion of the motors 320 to linear displacement of the primary spool 310. In this this manner, D3V 202 comprises three motor assemblies 304 to provide the same redundancy as provided by the motor assembles 204 of D3V 202 and operates to provide the selective engagement/disengagement as clutches 222 of D3V 202.

Referring now to FIG. 5, a cross-sectional side view of a D3V 402 is shown according to yet another embodiment of this disclosure. D3V 402 may generally be substantially similar to D3Vs 202, 302 and comprise a primary spool 410 and a secondary spool 412 coaxially aligned along axis 411 and disposed within body 414. D3V 402 also comprises at least one primary spool position sensor 416 and at least one secondary spool position sensor 418. D3V 402 is configured to operate in a substantially similar manner as D3Vs 202, 302 and is configured for operation in D3V actuator 200 of aircraft 100. Further, it will be appreciated that D3V 402 may be controlled by a flight control system and/or other electronic system of aircraft 100 in a substantially similar manner to D3Vs 202, 302. However, as opposed to the plurality of motor assemblies 204, 304 of D3V 202, 302 utilizing clutches 222, 322 respectively, D3V 402 comprises a piezo-actuated system 450. Piezo-actuated system 450 comprises a plurality of piezo stacks 452 that act against a primary plunger 454 coupled to the primary spool 410 on a first end of the D3V 402. The piezo stacks 452 and primary plunger 454 may generally be disposed within a housing 460. In some embodiments, the housing 460 may be attached to and/or coupled to the body 414 of the D3V 402.

Piezo-actuated system 450 further comprises a spring 456 and a secondary plunger 458 coupled to the primary spool 410 on a second end of the D3V 402 disposed within a spring housing 462. In some embodiments, the spring housing 462 may also be attached to and/or coupled to the body 414 of the D3V 402 in a substantially similar manner as housing 460. The spring 456 may generally be configured to bias the secondary plunger 458 away from a distal end of spring housing 462 and towards the plurality of piezo stacks 452. Accordingly, in operation, when a voltage is applied to any of the piezo stacks 452, the piezo stacks 452 receiving the voltage expand and displace primary spool 410 and/or secondary spool 412. When the voltage is removed from any of the piezo stacks 452, the piezo stacks 452 that lose voltage may retract and break contact with the primary plunger 454. In some embodiments, the piezo stacks 452 that lose voltage may retract beyond the operating range of the D3V 402. Additionally, in some embodiments, the piezo stacks 452 may also utilize an output lever arm that amplifies the output stroke of the piezo stacks 452. Further, each piezo stack 452 may comprise a dedicated control system (not pictured) that utilizes position feedback from a piezo position sensor (not pictured) of its associated piezo stack for health monitoring and/or failure detection, which may be communicated to a flight control system and/or other electronic system of aircraft 100. Thus, selective application and/or removal of a voltage from a piezo stack 452 operates to engage and/or disengage the piezo stack 452 from the primary plunger 454. In this manner, D3V 402 comprising the three piezo stacks 452 provides the same redundancy as provided by the motor assembles 204, 304 of D3 Vs 202, 302 and operates to provide the selective engagement/disengagement as the clutches 222, 322 of D3 Vs 202, 302. Furthermore, it will be appreciated that in some embodiments, piezo stacks 452 may be substituted for linear motors or other motive device comprising inherent positional memory that removes a failed device from contact with the primary plunger 454.

Referring now to FIG. 6, a schematic diagram of a general-purpose processor (e.g., electronic controller or computer) system 500 suitable for implementing the embodiments of this disclosure is shown. System 500 that includes a processing component 510 suitable for implementing one or more embodiments disclosed herein. In particular, one or more of the flight control systems and/or other electronic systems disclosed herein may comprise one or more systems 500. In addition to the processor 510 (which may be referred to as a central processor unit or CPU), the system 500 might include network connectivity devices 520, random access memory (RAM) 530, read only memory (ROM) 540, secondary storage 550, and input/output (I/O) devices 560. In some cases, some of these components may not be present or may be combined in various combinations with one another or with other components not shown. These components might be located in a single physical entity or in more than one physical entity. Any actions described herein as being taken by the processor 510 might be taken by the processor 510 alone or by the processor 510 in conjunction with one or more components shown or not shown in the system 500. It will be appreciated that the data described herein can be stored in memory and/or in one or more databases.

The processor 510 executes instructions, codes, computer programs, or scripts that it might access from the network connectivity devices 520, RAM 530, ROM 540, or secondary storage 550 (which might include various disk-based systems such as hard disk, floppy disk, optical disk, or other drive). While only one processor 510 is shown, multiple processors may be present. Thus, while instructions may be discussed as being executed by processor 510, the instructions may be executed simultaneously, serially, or otherwise by one or multiple processors 510. The processor 510 may be implemented as one or more CPU chips and/or application specific integrated chips (ASICs).

The network connectivity devices 520 may take the form of modems, modem banks, Ethernet devices, universal serial bus (USB) interface devices, serial interfaces, token ring devices, fiber distributed data interface (FDDI) devices, wireless local area network (WLAN) devices, radio transceiver devices such as code division multiple access (CDMA) devices, global system for mobile communications (GSM) radio transceiver devices, worldwide interoperability for microwave access (WiMAX) devices, and/or other well-known devices for connecting to networks. These network connectivity devices 520 may enable the processor 510 to communicate with the Internet or one or more telecommunications networks or other networks from which the processor 510 might receive information or to which the processor 510 might output information.

The network connectivity devices 520 might also include one or more transceiver components 525 capable of transmitting and/or receiving data wirelessly in the form of electromagnetic waves, such as radio frequency signals or microwave frequency signals. Alternatively, the data may propagate in or on the surface of electrical conductors, in coaxial cables, in waveguides, in optical media such as optical fiber, or in other media. The transceiver component 525 might include separate receiving and transmitting units or a single transceiver. Information transmitted or received by the transceiver 525 may include data that has been processed by the processor 510 or instructions that are to be executed by processor 510. Such information may be received from and outputted to a network in the form, for example, of a computer data baseband signal or signal embodied in a carrier wave. The data may be ordered according to different sequences as may be desirable for either processing or generating the data or transmitting or receiving the data. The baseband signal, the signal embedded in the carrier wave, or other types of signals currently used or hereafter developed may be referred to as the transmission medium and may be generated according to several methods well known to one skilled in the art.

The RAM 530 might be used to store volatile data and perhaps to store instructions that are executed by the processor 510. The ROM 540 is a non-volatile memory device that typically has a smaller memory capacity than the memory capacity of the secondary storage 550. ROM 540 might be used to store instructions and perhaps data that are read during execution of the instructions. Access to both RAM 530 and ROM 540 is typically faster than to secondary storage 550. The secondary storage 550 is typically comprised of one or more disk drives or tape drives and might be used for non-volatile storage of data or as an over-flow data storage device if RAM 530 is not large enough to hold all working data. Secondary storage 550 may be used to store programs or instructions that are loaded into RAM 530 when such programs are selected for execution or information is needed.

The I/O devices 560 may include liquid crystal displays (LCDs), touchscreen displays, keyboards, keypads, switches, dials, mice, track balls, voice recognizers, card readers, paper tape readers, printers, video monitors, transducers, sensors, motor drive electronics, or other well-known input or output devices. Also, the transceiver 525 might be considered to be a component of the I/O devices 560 instead of or in addition to being a component of the network connectivity devices 520. Some or all of the I/O devices 560 may be substantially similar to various components disclosed herein and/or may be components of any of the flight control systems and/or other electronic systems disclosed herein.

Referring now to FIG. 7, a flowchart of a method 600 of operating an aircraft 100 is shown according to this disclosure. Method 600 begins at block 602 by operating an aircraft 100 comprising a D3V actuator 200 comprising at least one D3V 202, 302, 402. Method 600 may continue at block 604 by detecting a failure of at least one of the motors 220, 320 or one of the piezo stacks 452 of at least one of the D3Vs 202, 302, 402. In some embodiments, detecting a failure of a motor 220, 320 or piezo stack 452 may be determined by the motor position sensor 228, 328 or a piezo position sensor communicating information to a flight control system regarding the position of at least one of the motors 220, 320 or piezo stacks 452 that does not match a commanded operational position of the motor 220, 320 or the piezo stack 452. In some embodiments, detecting a failure of a motor 220, 320 or piezo stack 452 may be determined by the motor 220, 320 or the piezo stack 452 failing to respond to a commanded operational position.

Method 600 may conclude at block 606 by selectively disengaging the clutch 222, 322 associated with the at least one failed motor 220, 320 or selectively disengaging the failed piezo stack 452 from the primary plunger 454 by removing the voltage from the failed piezo stack 452. Upon disengagement of the clutch 222, 322 of the at least one failed motor 220, 320 or the piezo stack 452 from the primary plunger 454, it will be appreciated that another operational motor configured in a standby mode or another piezo stack 452 configured in standby mode may be selectively engaged so as to maintain redundancy of multiple engaged motor assemblies 204, 304 in the D3V 202, 302 or multiple engaged piezo stacks 452 in D3V 402.

At least one embodiment is disclosed, and variations, combinations, and/or modifications of the embodiment(s) and/or features of the embodiment(s) made by a person having ordinary skill in the art are within the scope of this disclosure. Alternative embodiments that result from combining, integrating, and/or omitting features of the embodiment(s) are also within the scope of this disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . 50 percent, 51 percent, 52 percent, . . . , 95 percent, 96 percent, 95 percent, 98 percent, 99 percent, or 100 percent. Moreover, any numerical range defined by two R numbers as defined in the above is also specifically disclosed.

Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present invention. Also, the phrases "at least one of A, B, and C" and "A and/or B and/or C" should each be interpreted to include only A, only B, only C, or any combination of A, B, and C.

What is claimed is:

1. A spool valve, comprising:
   a body;
   a secondary spool carried within a bore of the body and linearly displaceable relative to the body;
   a primary spool carried within a bore of the secondary spool and linearly displaceable relative to the secondary spool and to the body;
   a plurality of piezo stacks coupled to a first end of the primary spool and configured to cause selective displacement of the primary spool;
   at least one position sensor configured to determine the position of the primary spool with respect to the secondary spool, to the body, or both;

a control system that utilizes data from the position sensor to detect a failure of any of the piezo stacks; and a spring coupled to a second end of the primary spool and configured for biasing the primary spool toward the piezo stacks;

wherein applying a voltage to at least one of the piezo stacks causes an output stroke of the plurality of the piezo strokes for displacing the primary spool;

wherein in response to the control system detecting a failure of any of the piezo stacks, the control system applies voltage to at least one other of the piezo stacks to cause displacement of the primary spool; and wherein the secondary spool is displaced together with the primary spool relative to the body if displacement of the primary spool relative to the secondary spool cannot occur.

2. The valve of claim 1, further comprising:

a primary plunger coupling the plurality of piezo stacks to the primary spool.

3. The valve of claim 1, further comprising:

a secondary plunger coupling the spring to the primary spool.

4. The valve of claim 1, wherein displacement of either of the spools alters a flowpath through the spool valve to alter a pitch of a plurality of rotor blades of an aircraft.

5. An aircraft, comprising:

a piston actuator; and a spool valve hydraulically coupled to the piston actuator and comprising:

a body;

a secondary spool located within a bore of the body and linearly displaceable relative to the body;

a primary spool located within a bore of the secondary spool and linearly displaceable relative to the secondary spool and the body;

a plurality of piezo stacks coupled to a first end of the primary spool and configured to cause selective displacement of the primary spool to actuate the piston actuator;

at least one position sensor configured to determine the position of the primary spool with respect to the secondary spool, to the body, or both;

a control system that utilizes data from the position sensor to detect a failure of any of the piezo stacks; and a spring coupled to a second end of the primary spool and configured for biasing the primary spool toward the piezo stacks;

wherein displacement of the primary spool is selectively controlled by a voltage applied to at least one of the piezo stacks;

wherein in response to the control system detecting a failure of any of the piezo stacks, the control system applies voltage to at least one other of the piezo stacks to cause displacement of the primary spool; and wherein the secondary spool is displaced together with the primary spool relative to the body if displacement of the primary spool relative to the secondary spool cannot occur.

6. The aircraft of claim 5, wherein the piston actuator is coupled to a plurality of rotor blades, and wherein actuation of the piston actuator alters a pitch of the plurality of rotor blades.

7. The aircraft of claim 5, wherein application of voltage to the plurality of piezo stacks is controlled by a flight control system of the aircraft.

8. The aircraft of claim 5, wherein the aircraft is a rotary-wing aircraft, a tiltrotor, or a fixed-wing aircraft.

9. A method of operating a spool valve, comprising:

providing a spool valve comprising an outer spool carried within and linearly displaceable relative to a bore of a body, an inner spool carried within a bore of the outer spool and linearly displaceable relative to the secondary spool and to the body, and a plurality of piezo stacks configured to cause selective displacement of the primary spool through an output stroke of the plurality of piezo stacks;

applying voltage to at least one of the piezo stacks to cause displacement of the primary spool;

detecting a failure of at least one of the piezo stacks and applying voltage to at least one other of the piezo stacks in response to the failure in order to cause displacement of the primary spool; and displacing the secondary spool together with the primary spool relative to the body if displacement of the primary spool relative to the secondary spool cannot occur.

10. The method of claim 9, further comprising:

biasing the primary spool toward the piezo stacks.

11. The method of claim 9, wherein detecting the failure of a piezo stack comprises detecting a position of at least one of piezo stacks and comparing the position to a commanded position.

\* \* \* \* \*